United States Patent [19]

Yokota

[11] Patent Number: 4,457,593

[45] Date of Patent: Jul. 3, 1984

[54] PHOTOGRAPHIC LENS SYSTEM

[75] Inventor: Hideo Yokota, Tokyo, Japan

[73] Assignee: Canon Kabushiki Kaisha, Tokyo, Japan

[21] Appl. No.: 235,644

[22] Filed: Feb. 18, 1981

[30] Foreign Application Priority Data

Feb. 19, 1980 [JP] Japan .................. 55-19418

[51] Int. Cl.³ .......................... G02B 9/34; G02B 9/60
[52] U.S. Cl. .................... 350/448; 350/438; 350/467; 350/469
[58] Field of Search ............... 350/467, 469, 448, 449, 350/438, 439

[56] References Cited

U.S. PATENT DOCUMENTS 1,900,966  3/1933  Wolfe.
2,356,694  8/1944  Potter et al. ............... 350/448 X
3,506,341  4/1970  Kazamaki et al. .............. 350/467
3,728,011  4/1973  Mori ......................... 350/439 X
4,124,276  11/1978 Okano et al. ................ 350/469 X
4,264,138  4/1981  Imai ......................... 350/467

Primary Examiner—John K. Corbin
Assistant Examiner—Scott J. Sugarman
Attorney, Agent, or Firm—Toren, McGeady and Stanger

[57] ABSTRACT

The photographic lens system disclosed includes a front lens arrangement of positive refractive power with a plurality of components having lens surfaces followed by a diaphragm. A light control includes a number of light absorbing regions on the surface of a component other than the surface adjacent the diaphragm. According to an embodiment, the light control includes a larger optically coaxial region and smaller outer regions surrounding the optically coaxial region. According to another embodiment, a negative refraction lens is arranged behind the diaphragm.

2 Claims, 12 Drawing Figures

A B C

C'
B'
A'

C"
B"
A"

PHOTOGRAPHIC LENS SYSTEM

BACKGROUND OF THE INVENTION

This invention relates to photographic objectives, are more particularly to the correction of an illumination distribution on the image plane against deterioration when the diaphragm stops down.

Interchangeable photographic objectives having standard or semi-standard angles of view, for use in single lens reflex cameras, employ an arrangement in which the diaphragm is located at or near the center of the physical length of the objective. However, lens shutter-equipped cameras which require further minimization in the bulk and size of their objective lenses have made increasing use of (1) a diaphragm behind the entire lens system, i.e., a so-called rear diaphragm lens, or (2) a lens with the diaphragm followed by a component of a negative power.

As these types (1) and (2) of objectives have a large angular magnification of the principle ray of light of the pupil, when the diaphragm stops down, the uniformity of illumination distribution on the image plane tends to deteriorate at the corners of the film frame more sharply than the other types of objectives, for example, objectives with the diaphragm followed by a positive component.

The rear diaphragm lens and negative component-follow-stop type objectives have the advantage that when fully open, the marginal illumination can be made rather higher than when the lens component behind the stop is positive. When the lens is closed down by two or three stops from the fully open position, however, the ratio of the marginal illumination to the central illumination becomes larger than when the lens is of the positive component-follow-stop type.

Standard photographic lenses regardless of the lens construction, are easy to design even for the oblique pencil from the maximum angle of view to pass through almost the entire area of the aperture usually when stopped down by two or three steps. With such design, when applied to the positive component-follow-stop type, the corner illumination is not less than about 90% of the central illumination at a maximum semi-angle view of, for example, 27°, but when applied to the behind stop type or the negative component-follow-stop type, it is very difficult to reach 70% at least. As a result, the illumination distribution over the entire area of the film frame has been left with as low a uniformity as 40%.

SUMMARY OF THE INVENTION

An object of the present invention is to prevent the marginal illumination from being lowered when the behind-stop type or negative component-follow-stop type lens is somewhat stopped down.

The present inventor has re-examined the characteristic features of these two types of lens construction, and has found that when stopped down by two or three steps, there is created a space in which the on-axial light bundle and the off-axial light bundle of an angle of view near the maximum one overlap each other at an extremely small rate, or do not overlap at all at a further location from the diaphragm. If a light absorbing filter for reducing the transmittance in this space is at a central region (near the optical axis), the intensity of the light bundle near the optical axis is reduced, thus relatively increasing the marginal illumination. The present invention has this background.

However, the use of the gray filter independently results in an increase of the total length of the objective by a length equal to the thickness of the filter. To avoid this, therefore, one method is to apply a light absorption coating on one of the lens surfaces. It is already known in the art to provide an optical system having a light absorption coating deposited in the central area of the lens surface as for example disclosed in U.S. Pat. Nos. 3,183,814 and 3,700,314. These known technical ideas aim at the prevention of a lowering of the ability of controlling the amount of light as the aperture nears the minimum size of opening, and may therefore be considered as making use of the light absorption area in cooperation with the diaphragm in widening the dynamic range of aperture control of the lens. Particularly regarding the location of the lens surface on which the light absorption coating is applied close to the diaphragm, and their technical subjects, the present invention has to be clearly distinguished from these known technical ideas.

Figure 1A:
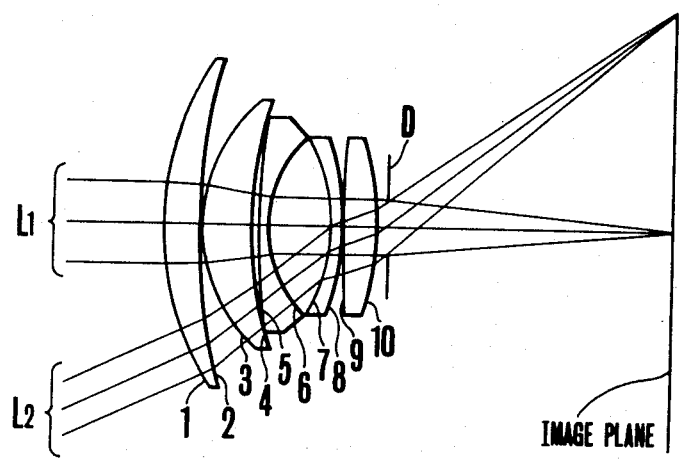
FIG. 1A is a longitudinal sectional view of one example of an objective of the behind-the-stop type.

DESCRIPTION OF THE PREFERRED EMBODIMENTS:

FIG. 1A shows an objective of the behind-the-stop type comprising, from front to rear, two positive meniscus lenses of forward convexity, a negative meniscus lens of forward concavity, and a bi-convex lens followed by a diaphragm D of variable aperture when stopped down from the fully open F-number of 1:1.9 to an F-number of 1:5.6 for which an on-axial pencil L2 and an off-axial pencil L2 of a maximum possible angle of view take their optical paths. As is understandable from the drawing, there is a space from the 1st to the 6th lens surfaces counting from the front in which the on-axial pencil and the off-axial maximum angle pencil (an off-axial pencil incident upon the first surface at the maximum angle of view to be covered) have no common part. Therefore, is any one of the 1st to the 6th surfaces is provided with a light-absorption coating in a central region of the area through which the on-axial pencil of an effective diameter corresponding to F-number of 1:5.6 passes, the light absorption coating does not reduce the intensity of the off-axial pencil of the maximum angle of view, and as a result the marginal illumination is improved in a range of aperture values from 5.6 to the minimum.

Figure 1B:
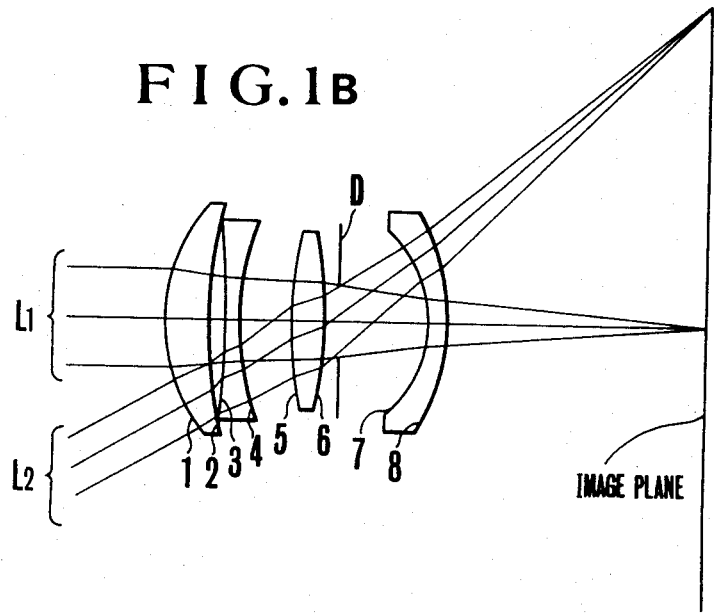
FIG. 1B is a similar view of one example of an objective of the negative component-follow-stop type.

Also shown in FIG. 1B is a photographic objective comprising, from front to rear, a positive meniscus lens of forward convexity, a bi-concave lens, a bi-convex lens, a diaphragm D, and a negative meniscus lens of forward concavity when stopped down to an F-number 1:5.6 for which the paraxial and oblique pencils L1 and L2 take their optical paths. With this objective when provided with a light absorption coating on any one of the 1st to the 3rd lens surfaces, an improvement in the marginal illumination can be achieved also.

The construction of this light absorption coating with uniformity of the density over the entire area of the central region gives rise to a serious problem which will next be explained in greater detail.

Figure 2:
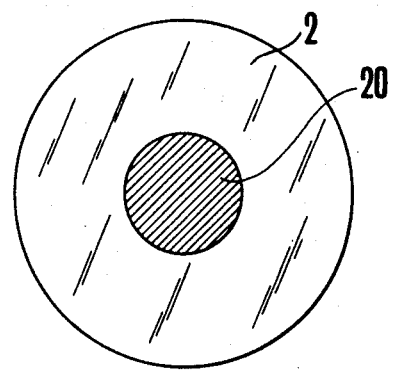
FIG. 2 is an elevational view of a lens surface coated with a light absorbing layer.
Figure 3:
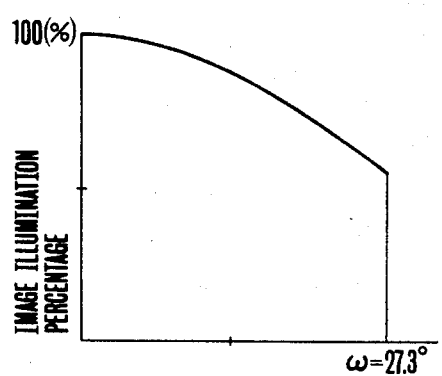
FIG. 3 is a graphic representation of the illumination distribution over the area of the film frame in the image plane of the behind-the-stop type objective having the light absorbing layer of FIG. 2.
Figure 4:
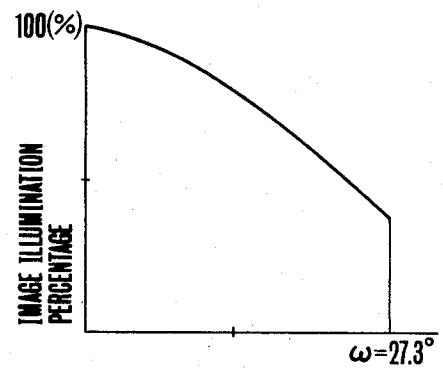
FIG. 4 is a similar representation when not provided with the light-absorbing layer.
Figure 5:
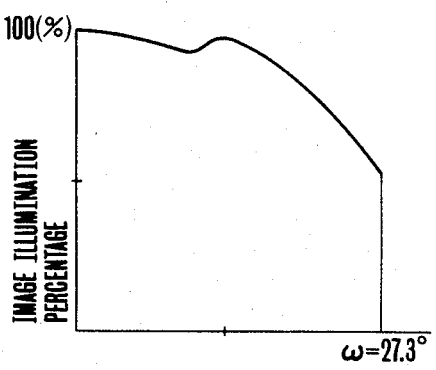
FIG. 5 is a similar representation when the objective having the light-absorbing layer is stopped down.

When the 2nd surface of the objective of FIG. 1A is coated with a light absorption layer of 25% density in a central round region which admits passage of the on-axial pencil in F-number 1:5.6 as shown in FIG. 2, the illumination on the image plane varies with the angle of view as shown in FIG. 3 to a less extent than when the light-absorption layer is lacking as shown in FIG. 4. However, when this light absorption layer-equipped objective is stopped down to an F-number 1:16, the progressive variation of the illumination from the center of the area of the film frame to the corner is broken as shown in FIG. 5 with the resultant image illumination percentage curve having a hump in the intermediate zone of the field. In actual photographs, this appears to be a bright circular band on the darker background of the picture, thus giving a very unpleasant impression to the viewers. This incidental drawback is attributable to the interaction between the absorption layer and the diaphragm, and can be overcome by constructing the absorption layer as having densities progressively lower from the vicinity of the optical axis to the margin as is known in the above-cited U.S. Pat. No. 3,700,314. A vacuum deposition technique of manufacturing this kind of coating is available for the production run of a small number of articles economically, but is not amenable to the mass production line.

According to the present invention, the above-described problems of the appearance of a bright ring band and of the expensive production have been solved by the following techniques:

(1) The light absorption coating is made consisting of a plurality of elementary regions of light absorbing material such as chromium or aluminum deposited on a single lens surface in partially distributed relation; and (2) When the lens is stopped down to the minimum, the concurrent light bundle passes the one of the lens surfaces which is provided with the light absorption coating in an area represented by $S(\omega)$ as a function of the angle of view $\omega$, and the light absorbing region in this area of light passage has an area represented by $S'(\omega)$ as a function of the angle of view $\omega$, and further the aperture efficiency of the lens takes a value likewise represented by $V(\omega)$. Then, letting $\gamma$ denote the percentage of light transmitted through the light absorption coating, the value of the following function $E(\frac{\omega}{s})$ is made to decrease with the increase of the field angle $\frac{\omega}{s}$.

$$E(\omega) = \left\{ \frac{S(\omega) + (\gamma - 1) S'(\omega)}{S(\omega)} \right\} \cos^4(\omega) \cdot V(\omega)$$

In connection with this equation it should be explained that $\cos^4(\frac{\omega}{s})$ is, as is well known, a factor similar to that in the $\cos^4$ law by which the illumination at the corner of the corresponding field is less than the central illumination, and another factor $$\left\{ \frac{S(\omega) + (\gamma - 1) S'(\omega)}{S(\omega)} \right\}$$

represents the existing characteristics of the light absorption coating. Further since $V(\omega)$ is the aperture efficiency, the value of this function $E(\omega)$ is found to be an illumination ratio.

Figure 6:
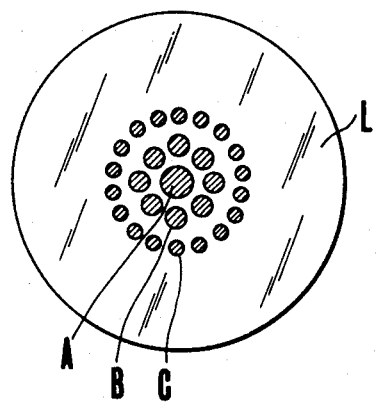
FIGS. 6 to 8 are plan views of three different examples of practical light absorption coatings of the invention.
Figure 7:
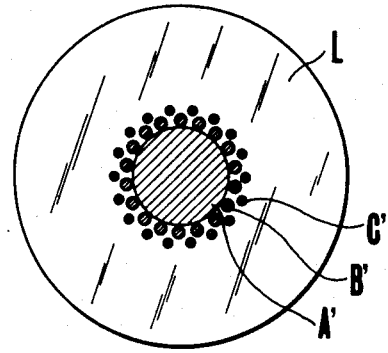
Figure 8:
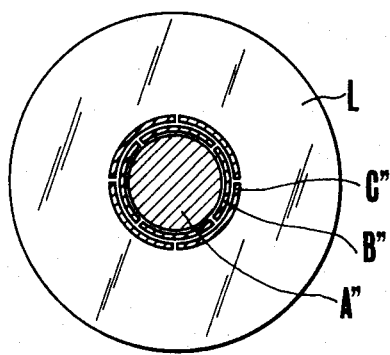
Figure 9:
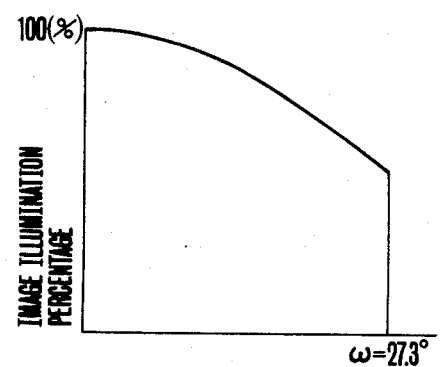
FIG. 9 is a graphic representation of the illumination distribution over the area of a film frame in the image plane of the behind-the-stop type objective having the light absorption coating of the invention when slightly stopped down to 5.6 in F-number.
Figure 10:
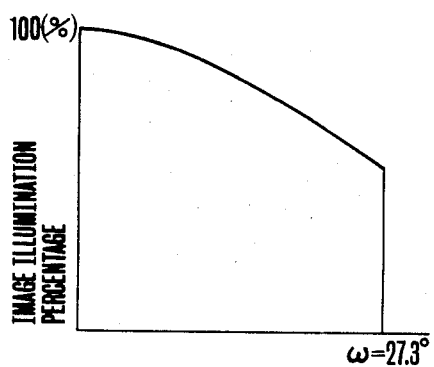
FIG. 10 is a similar representation when further stopped down to 16 in F-number.

It should be pointed out here that only when the light absorption coating is constructed in accordance with the first feature (1) of the invention, though the coating takes the form of a single layer of the same material, the $S'(\omega)/S(\omega)$ can be controlled so that it is possible to decrease the $E(\omega)$ as the field angle $\omega$ increases. The term "elementary region in plurality" means that the elementary region may vary in shape and size from region to region. FIGS. 6, 7 and 8 show different examples of light absorption coatings from each other. In the drawings, L is a lens surface. In FIG. 6, A is a circular elementary region with its center coincident with the optical axis. This region A is surrounded by a great number of elementary regions of smaller size B and C. In FIG. 7, a far larger circular elementary region A' with its center at the optical axis is associated with a number of small elementary regions B' adjacent to the boundary of the central region A' in concentrically equally spaced relation, and after a small separation therefrom a number of dot-like elementary region C'. Instead of using the circular shape, it is possible to use concentrically arcuate stripes B'' and C'' surrounding the central area A'' as shown in FIG. 8. Since FIGS. 6, 7 and 8 schematically show the shape and size of the region for the purpose of clarity. In practice, therefore, the condition of equation $E(\omega)$ will be satisified by the use of a far more complicated pattern of the regions when the shapes and arrangements of these regions are basically taken into account. With the use of such light absorption coating structure on the certain lens surface, as the value of the function $E(\omega)$ decreases with the increase of the field angle $\omega$, the hump of the image illumination distribution curve which would otherwise appear at the intermediate field angles disappears. For example, the objective of FIG. 1 when stopped down to an F-number 1:5.6 provides a narrowed range of smooth variation of image illumination with the field angle as shown in FIG. 9 which is maintained almost unchanged even when further stopped down to an F-number 1:16 as shown in FIG. 10.

In addition to the above-cited features (1) and (2), (3) After the application of the light absorption coating on the lens surface, a mono-layer or multi-layer coating of different material from that of the light absorption coating is applied on the entire area of that lens surface as a protective coating.

(4) This protective coating also serves as an anti-reflection coating outside the light absorption coating.

Figure 11:
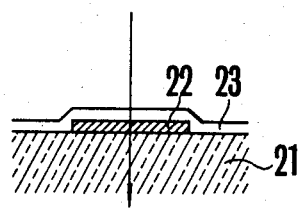
FIG. 11 is a sectional view of the light absorption coating with an anti-reflection coating thereon.

FIG. 11 shows the arrangement of these two coatings formed by the vacuum deposition techniques, where 21 is a glass substrate; 2 is a metal thin film of light absorbing property; and 3 is an anti-reflection coating of magnesium fluoride.

As most of the light absorbing materials in the form of such thin layer tend to lack sufficient durability, the later application of the anti-reflection coating solves this problem. This is particularly true when the protective coating extends over the entire area of the lens surface so that the light-absorption coating is sealed by the protective coating.

It will be appreciated from the foregoing that the present invention has advantages that even when the diaphragm is closed down by a few number of stops from the full open position, the illumination at the corner of the field is not caused to lower too much, and that also when the diaphragm is closed down by a large number of stops, the picture quality is not caused to deteriorate. A further advantage is that the filter of the invention is amenable to the very low unit-cost production techniques. Lenses on the object side of the diaphragm may, for example, be referred to as the front optical means.

What is claimed is:

1. A photographic objective lens system, comprising:
   front optical means having a plurality of optical components, a diaphragm arranged at the image side of said front optical means, a light absorbing layer provided at a surface at the optical components other than the surface adjacent the diaphragm and having a central elementary region, and a plurality of outer elementary regions on the light absorbing layer adjacent a circumference of said central elementary region, said central region and said outer regions being separated from each other;
   said front optical means comprising, from front to rear, two positive meniscus lenses of forward convexity, a negative meniscus lens of forward concavity, and a bi-convex lens, and said central elementary region and said outer elementary region lying on one of the first to the sixth lens surfaces counting from the front.

2. A photographic objective lens system, comprising:
   front optical means having a plurality of optical components, a diaphragm arranged at the image side of said front optical means, a light absorbing layer provided at a surface at the optical components other than the surface adjacent the diaphragm and having a central elementary region, and a plurality of outer elementary regions on the light absorbing layer adjacent a circumference of said central elementary region, said central region and said outer regions being separated from each other;
   said front optical means comprising, from front to rear, a positive meniscus lens of forward convexity, a biconcave lens and a bi-convex lens, and said light control means lying on one of the first to the third lens surfaces counting from the front; and a negative meniscus lens of forward concavity arranged in rear of said diaphragm.

* * * * *